United States Patent
An

(10) Patent No.: US 7,398,092 B2
(45) Date of Patent: Jul. 8, 2008

(54) LOCATION TRACING SYSTEM FOR MOBILE TELECOMMUNICATION TERMINAL AND METHOD THEREOF

(75) Inventor: Kwang-Jin An, Seoul (KR)

(73) Assignee: LG Electronics Inc., Seoul (KR)

( * ) Notice: Subject to any disclaimer, the term of this patent is extended or adjusted under 35 U.S.C. 154(b) by 863 days.

(21) Appl. No.: 10/394,053

(22) Filed: Mar. 24, 2003

(65) Prior Publication Data

US 2003/0190920 A1 Oct. 9, 2003

(30) Foreign Application Priority Data

Mar. 27, 2002 (KR) ............ 10-2002-0016801

(51) Int. Cl.
*H04Q 7/20* (2006.01)
*H04Q 7/22* (2006.01)
*H04M 11/04* (2006.01)
*H04M 3/42* (2006.01)
*H04M 3/493* (2006.01)

(52) U.S. Cl. ........... 455/456.1; 455/404.2; 455/414.2; 455/440

(58) Field of Classification Search ............ 455/562.1, 455/67.6, 456, 67.16, 456.1, 440, 404.2, 455/414.2; 370/350
See application file for complete search history.

(56) References Cited

U.S. PATENT DOCUMENTS

| | | | | |
|---|---|---|---|---|
| 6,526,039 | B1 * | 2/2003 | Dahlman et al. ............ 370/350 |
| 6,704,547 | B2 * | 3/2004 | Kuwahara et al. ......... 455/67.16 |
| 6,980,805 | B2 * | 12/2005 | Matsumoto et al. .......... 455/440 |
| 2002/0009974 | A1 * | 1/2002 | Kuwahara et al. ........... 455/67.6 |
| 2002/0086682 | A1 * | 7/2002 | Naghian ..................... 455/456 |
| 2002/0132628 | A1 * | 9/2002 | Matsumoto et al. .......... 455/456 |
| 2003/0114169 | A1 * | 6/2003 | Okamura et al. ............. 455/456 |
| 2004/0033818 | A1 * | 2/2004 | Nakamura ................. 455/562.1 |

FOREIGN PATENT DOCUMENTS

CN 1199315 11/1998

OTHER PUBLICATIONS

CN Office Action and English language translation (Dec. 10, 2004).

* cited by examiner

*Primary Examiner*—Thjuan K Addy
(74) *Attorney, Agent, or Firm*—Ked & Associates, LLP

(57) ABSTRACT

A system and method for tracing a location of a mobile terminal involves having the mobile terminal transmit a predetermined signal including discrimination information with a predetermined interval. A plurality of base stations calculate distances from the mobile terminal based on a reception time for the predetermined signal transmitted from the terminal and then transmit the distance values to a cell controller. The cell controller traces a location of the mobile terminal using the distance values transmitted from the base stations. Accordingly, the system and method does not need a GPS receiver to calculate the terminal location, thereby reducing costs and location error range for the mobile telecommunication system.

24 Claims, 3 Drawing Sheets

LOCATION TRACING SYSTEM FOR MOBILE TELECOMMUNICATION TERMINAL AND METHOD THEREOF

BACKGROUND OF THE INVENTION

1. Field of the Invention

The present invention relates to a mobile telecommunication terminal, and more particularly to a system and method for tracing a location of the terminal in a service area.

2. Background of the Related Art

One conventional system for tracing the location of a mobile telecommunication terminal involves mounting a global positioning system (GPS) receiver in the terminal and then determining location by analyzing a signal received from a low-earth-orbit satellite. A second conventional system traces the location of a terminal using a network of a wireless telecommunication system. These methods will now be explained.

FIG. 1 shows the first conventional system, which traces the location of a mobile telecommunication terminal by analyzing a signal from a low-earth-orbit satellite. This system includes a satellite receiving unit 10 which receives satellite signals transmitted from a plurality of universal GPS satellites (1~N). Location information included in the received signals and time deviations of the received signals, are then used to trace the location of the terminal. In this system, the GPS satellites (1~N) and the satellite receiving unit 10 require a substantial amount of locking time at first. Also, sending/receiving of the satellite signal is disturbed by adjacent architectures and a receiving sensitivity of the satellite signal is very weak. Accordingly, a location of the mobile telecommunication terminal is inaccurately recognized and much cost is required.

FIG. 2 shows the second conventional system, which traces the location of the mobile telecommunication terminal using a network of a wireless telecommunication system. This system includes a plurality of base stations 22-1, 22-2, . . . 22-n which receive a predetermined signal transmitted from the mobile telecommunication terminal 21. A location calculation unit 23 then calculates a location of the terminal using location information according to the predetermined signal from the plurality of base stations and reception time deviation between the received signals. The calculated result is provided to the mobile telecommunication terminal 21.

The second conventional system described above performs location tracing based on a distance difference between the mobile telecommunication terminal 21 and the base stations 22-1, 22-2, . . . 22-n. As a result, a base station located far from the terminal has difficulty in receiving a signal necessary to calculate a location, since the base station has a weak receiving sensitivity for the signal transmitted from the terminal. In order to solve this problem, it has been proposed to increase a strength for transmittance force of the corresponding terminal. However, it has been shown that a terminal having an increased transmittance force does not easily recognize the signal transmitted from a base station located far from the terminal. That is, in the second conventional system for tracing a location of the mobile telecommunication terminal using a network of a wireless telecommunication system, even if the GPS receiver does not have to be mounted in the mobile telecommunication terminal, an error range for a location of the terminal is substantial.

SUMMARY OF THE INVENTION

An object of the invention is to solve at least the above problems and/or disadvantages and to provide at least the advantages described hereinafter.

An object of the present invention is to provide a system and method for tracing the location of a mobile telecommunication terminal by calculating distances between the terminal and base stations based on delayed time for receiving a predetermined signal transmitted from the terminal to the base stations.

It is another object of the present invention to provide the base stations with distance calculation algorithm processing units which calculate distances between the base stations and the mobile telecommunication terminal.

To achieve these and other objects and advantages, the present invention provides a location tracing system for a mobile telecommunication terminal comprising: mobile telecommunication terminals for transmitting predetermined signals including their discrimination information with predetermined intervals; a plurality of base stations for calculating distances from the mobile telecommunication terminals on the basis of reception time for the predetermined signals transmitted from the mobile telecommunication terminals and then transmitting the distance values; and a cell controller for tracing locations of the mobile telecommunication terminals by using the distance values transmitted from the plurality of base stations. Herein, the cell controller sets/stores location information corresponding to the respective distance values in a table in advance and certifies the location information by the table, thereby determining regions which are the most similar to locations of the mobile telecommunication terminals.

The present invention is also a method for tracing locations of the mobile telecommunication terminals comprising: dividing a region around the base stations, calculating distances between mobile telecommunication terminals located at the divided regions and each base station, and setting/storing the distance values and location information by the distance values in a table of a cell controller in advance; receiving discrimination information transmitted from the mobile telecommunication terminals and calculating distances between the mobile telecommunication terminals and the respective base stations on the basis of delayed time for receiving the discrimination information; transmitting the calculated distance values to the cell controller; and discriminating location information corresponding to the distance values between the mobile telecommunication terminals and the respective base stations transmitted from the respective base stations by the table of the cell controller, thereby tracing locations of the mobile telecommunication terminals.

DETAILED DESCRIPTION OF PREFERRED EMBODIMENTS

Figure 1:
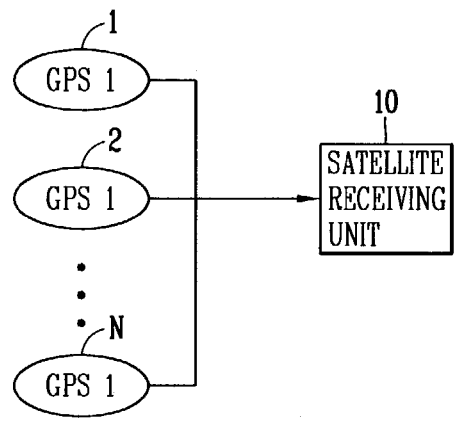
FIG. 1 is a diagram showing a construction of a first system for tracing a location of a mobile telecommunication terminal by analyzing a satellite signal according to a conventional low earth orbit satellite.
Figure 2:
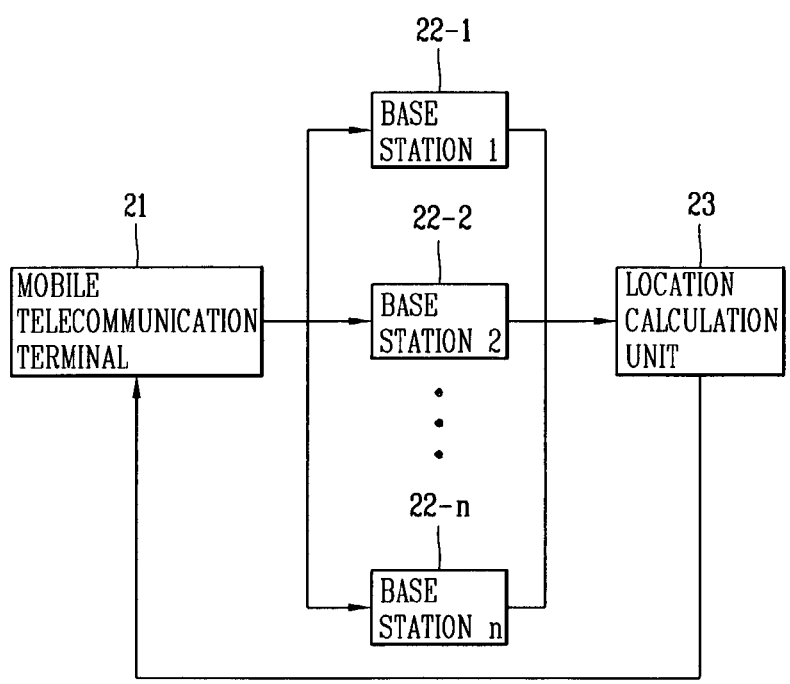
FIG. 2 is a diagram showing a construction of a second system for tracing a location of a mobile telecommunication terminal by using a network of a conventional wireless telecommunication system.
Figure 3:
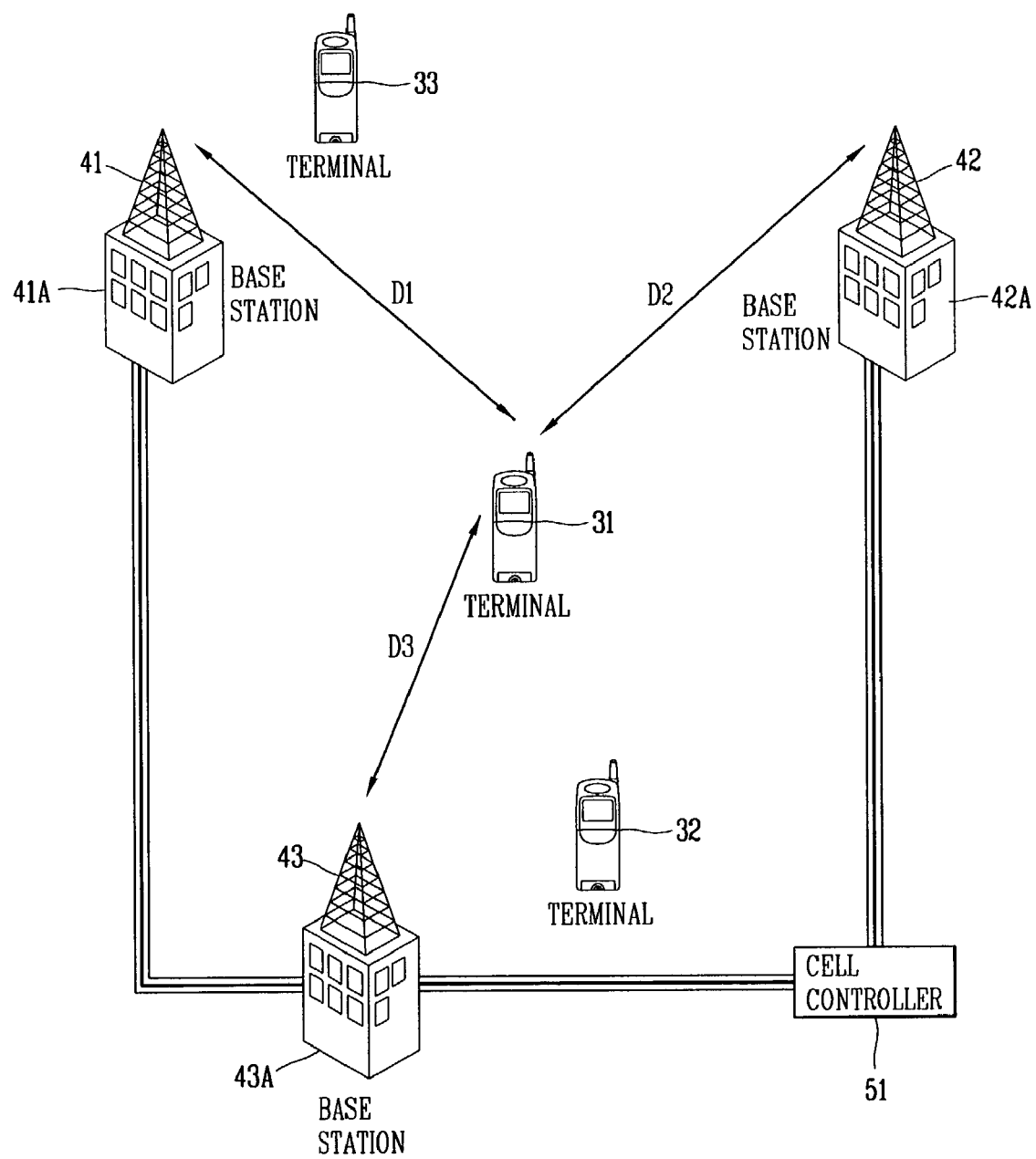
FIG. 3 is a diagram showing a location tracing system for a mobile telecommunication terminal according to one embodiment of the present invention.

FIG. 3 is a diagram showing a system for tracing a location of a mobile telecommunication terminal according to one embodiment of the present invention. This system includes mobile telecommunication terminals 31, 32, and 33, base stations 41, 42, and 43, and a cell controller 51. The mobile telecommunication terminals transmit predetermined signals including discrimination information with a predetermined interval. The base stations calculate distance values from the mobile telecommunication terminals based on times for receiving the predetermined signals transmitted from the mobile telecommunication terminals. The base stations then transmit the distance values. The cell controller traces locations of the mobile telecommunication terminals using the distance values transmitted from the plurality of base stations. In this system, the base stations are provided with distance-calculation algorithm processing units 41A, 42A, and 43A which calculate respective distances from the mobile telecommunication terminals 31, 32, and 33.

Operations of the location tracing system of the present invention will now be explained. First, the respective mobile telecommunication terminals 31, 32, and 33 transmit predetermined signals including their discrimination information to the base stations 41, 42, and 43 with predetermined intervals.

Then, for each terminal 31, 32, and 33, the base stations 41, 42, and 43 calculate distances from the mobile telecommunication terminal based on delayed times for receiving the predetermined signal from the terminal. At this time, in order to calculate the distances more accurately, a height of an antenna mounted at the base station has to be necessarily considered and the Pythagorean theorem is applied.

The distance calculation algorithm processing units 41A, 42A, and 43A mounted in the base stations 41, 42, and 43 include algorithms for calculating distances from the mobile telecommunication terminals and calculate accurate distance values through the algorithms. At this time, the algorithm maybe realized as a program which sequentially calculates distances between the mobile telecommunication terminals and the base stations according to the Pythagorean theorem. The distance calculation for which the Pythagorean theorem is used will be explained.

Figure 4:
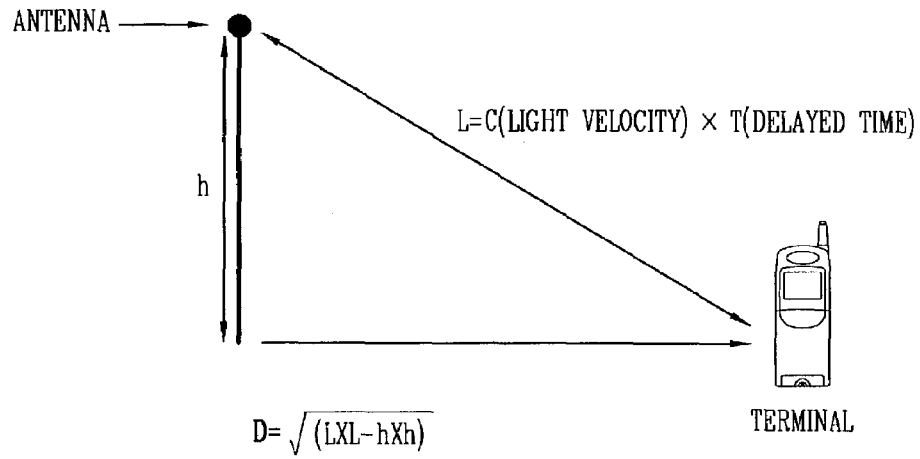
FIG. 4 is a diagram indicating how a distance calculation maybe performed between a base station and a mobile telecommunication terminal based on a delayed time of a predetermined signal transmitted from the mobile telecommunication terminal.

FIG. 4 is a diagram explaining a distance calculation between one of the base stations and a mobile telecommunication terminal based on a delayed time of a predetermined signal transmitted from the mobile telecommunication terminal.

As shown, the distance L between the base station antenna and the mobile telecommunication terminal is obtained by multiplying the height of the antenna h and reach delay time T of the predetermined signals transmitted from the terminal to the base station. Then, the distance D between the terminal and the base station is obtained by using the Pythagorean theorem, where $D=\sqrt{L^2-h^2}$.

Subsequently, the cell controller 51 combines distance information according to the distance values transmitted from the plurality of base stations and thereby traces locations of the mobile telecommunication terminals. Herein, the cell controller 51 sets/stores location information corresponding to each distance information in a table (not shown), and identifies the location information according to the distance information through the table, thereby determining regions which are the most similar to locations the mobile telecommunication terminals.

Figure 5:
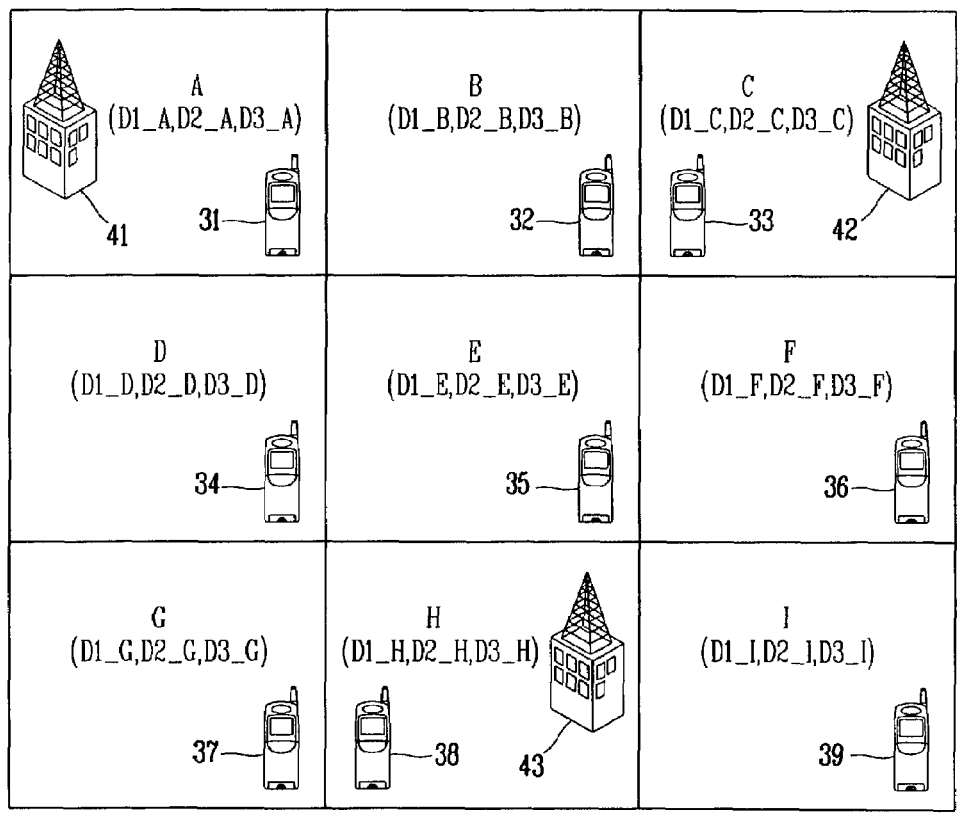
FIG. 5 is a diagram explaining a location tracing method for a mobile telecommunication terminal according to an embodiment of the present invention.

FIG. 5 is a diagram illustrating a method for tracing a location of the terminal using a table mounted in the cell controller 51 in accordance with one embodiment of the present invention. This method includes dividing a region around or near one or more base stations into a plurality of areas, calculating distances between each base station and the mobile telecommunication terminal which maybe located in one of the divided areas and setting/storing the distance values and location information by the distance values in the table of the cell controller in advance. The method further includes receiving discrimination information transmitted from the mobile terminal and calculating distances between the mobile terminal and the respective base stations based on a delayed time for receiving the discrimination information.

The calculated distance values are then transmitted to the cell controller and location information corresponding to the distance values between the mobile telecommunication terminal and the respective base stations transmitted from the respective base stations and discriminated through the table of the cell controller, thereby tracing locations of the mobile telecommunication terminals. A non-limiting example of this method follows.

In order to trace locations of a mobile telecommunication terminal using three base stations, a region encompassing, near, or adjacent the three base stations is divided into areas A, B, C, . . . and I. It is noted that the divided region is not limited to areas A~I, as it is possible to divide the regions into more or fewer areas. Also, even though three base stations are illustrated in drawings, those skilled in the art can appreciate that a different number of base stations maybe included. For example if there are more than three base stations, locations of the terminals located at expanded regions which extend outside the divided areas or which are located at detail areas except the center portion can be traced.

The respective base stations calculate coordinate values (D1_A, D2_A, D3_A), (D1_B, D2_B, D3_B), (D1_C, D2_C, D3_C) . . . (D1_I, D2_I, D3_I) corresponding to distances between the terminals located at center portions of the divided areas A, B, C, . . . and I and the base stations. Then, the base stations transmit the values to the cell controller which connects the respective base stations. The cell controller previously sets/stores location information corresponding to the coordinate values in the basis table, and discriminates location information corresponding to the coordinate values in the table, to thereby tracing locations of the terminals.

For example in case that one mobile telecommunication terminal 31 is located at a center portion of the A region, location tracing may be performed as follows.

First, the coordinate values corresponding to distances between the base stations 41, 42, and 43 and the mobile telecommunication terminal 31 are calculated at the base stations 41, 42, and 43 and transmitted to the cell controller 51. Then, the cell controller 51 discriminates location information previously set and stored in the table mounted therein corresponding to the coordinate values D1, D2, and D3, thereby identifying that terminal 31 is located at the A region.

In the case where terminals are located at portions except the center portions in the divided areas, the predetermined region is again divided into detail areas and corresponding coordinate values and location information corresponding to the coordinate values are previously set and stored in the table. Coordinate values corresponding to distances between terminals located at the portions except the center portions in the divided predetermined region and the base stations are calculated in the respective base stations 41, 42, and 43. Subsequently, the cell controller 51 compares the coordinate values with those stored in the table, determines coordinate values of the basis table corresponding to the coordinate values, and selects location information corresponding to the coordinate values, thereby tracing a location of the mobile telecommunication terminal 31.

The location tracing method for the mobile telecommunication terminal 31 is suitable for a sophisticated location tracing of the mobile telecommunication terminal, since the divided region is re-divided into detail areas and thereby many coordinate values and location information corresponding to the coordinate values are previously set and stored in the basis table.

As another example of the location tracing method involves the case where the mobile telecommunication terminal 31 is located at another portion except a center portion in one or more of the divided areas. Here, the respective divided areas regions are re-divided into several regions not into detail areas, and corresponding coordinate values and location information corresponding to the coordinate values are previously set and stored in the basis table. Then, coordinate values corresponding to distances between the terminal located at another portion except the center portion in the predetermined area and the base stations are calculated in the base stations 41, 42, and 43. Then, the cell controller 51 compares the coordinate values with those stored in the table, discriminates coordinate values of the basis table which are the most similar to the coordinate values, and selects location information corresponding to the coordinate values, thereby tracing a location of the mobile telecommunication terminal 31.

The case where one mobile telecommunication terminal 31 is located at another portions except a center portion in the A area will now be explained.

First, coordinate values corresponding to distances between the base stations 41, 42, and 43 and the mobile telecommunication terminal 31 are calculated at the base stations 41, 42, and 43 and transmitted to the cell controller 51. The cell controller 51 compares the coordinate values with those previously calculated and stored in the table in accordance with that the A region is re-divided into several regions, discriminates coordinate values of the basis table which are the most similar to the coordinate values, and selects location information corresponding to the coordinate values, thereby identifying that the mobile telecommunication terminal 31 is located at the predetermined region of the A region.

Accordingly, the cell controller 51 determines and traces locations of the terminals wherever another mobile telecommunication terminals 3, ... 39 except the terminal 31 are located among said regions B, C, D ..., and I.

Subsequently, the cell controller 51 transmits region information of the traced mobile telecommunication terminal to the respective mobile telecommunication terminals 32, 33 ..., and 39. Therefore, the respective terminals 32, 33, ... and 39 identify their locations by receiving the region information.

As aforementioned, in the location tracing system according to the present invention, distances between the terminals and the base stations are calculated by using reach delay time of predetermined signals transmitted from the terminals to the base stations and then the table of the cell controller which previously sets and stores location information corresponding to the calculated distances is identified, thereby tracing locations of the mobile telecommunication terminals. Accordingly, since the location tracing system according to the present invention does not need the GPS receiver which had to be necessarily mounted in the conventional terminal at the time of using the GPS, a system realization is facilitated. Also, since the related resource can be used as it is, a cost is reduced.

Besides, when compared with the conventional location tracing system for tracing a location of the terminal by using a network of a wireless communication system, the location tracing system according to the present invention has a greatly reduced error range.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A location tracing system for mobile telecommunication terminals comprising:

a mobile terminal for transmitting a predetermined signal with a predetermined interval;

a plurality of base stations, each calculating a distance from the mobile terminal based on a reception time of the predetermined signal transmitted from the mobile terminal; and a cell controller which traces a location of the mobile terminal based on distance values transmitted from the plurality of base stations, the cell controller coupled to the base stations and located at a position different from the location of the mobile terminal, the cell controller tracing the location of the mobile terminal by:

pre-storing coordinate values for each of a plurality of regions adjacent to or including the base stations, the coordinate values for each region indicating distances between the region and respective ones of the base stations;

comparing the distance values transmitted from the base stations to each of the prestored coordinate values; and determining the location of the mobile terminal as corresponding to one of said plurality of regions based on the comparison.

2. The system of claim 1, wherein each of the plurality of base stations includes a distance calculation processor which calculates a distance D between the mobile terminal and said each base station.

3. The system of claim 2, wherein the distance calculation processor in each of the plurality of base stations calculate the distance D based on the following equations:

$$L = C \times T, \; D = \sqrt{(L \times L) - (h \times h)}$$

where C denotes light velocity, T denotes reach delay time of a predetermined signal transmitted from the base station to the terminal, and h denotes a height of a base station antenna.

4. The system of claim 2, wherein the distance calculation processor in each of the plurality of base stations calculates the distance D based on a height of an antenna mounted at said each base station.

5. The system of claim 1, wherein the distance value is expressed as a coordinate value.

6. A method for tracing a location of mobile telecommunication terminals comprising:
dividing a region around base stations into a predetermined number of areas;
calculating distances between a mobile terminal located in the divided areas and each base station, and setting/storing the distance values and location information by the distance values in a table of a cell controller in advance;
receiving discrimination information transmitted from the mobile terminal and calculating distances between the mobile terminal and the respective base stations based on delayed time for receiving the discrimination information;
transmitting the calculated distance values to the cell controller; and
discriminating location information corresponding to the distance values between the mobile terminal and the respective base stations transmitted from the respective base stations through the table of the cell controller, said location information corresponding to a location of the mobile terminal.

7. The method of claim 6, wherein the distance ID between the mobile terminal and the base station is calculated based on the following equations:

$$L = C \times T, D = \sqrt{(L \times L) - (h \times h)}$$

where C denotes light velocity, T denotes reach delay time of a predetermined signal transmitted from the base station to the terminal, and h denotes a height of a base station antenna.

8. The method of claim 6, further comprising:
transmitting the location information to the mobile telecommunication terminal again.

9. The method of claim 6, wherein the calculated distance value D is expressed as a coordinate value.

10. A method for tracing a location of mobile telecommunication terminals comprising:
when a mobile terminal is located at a portion other than a center portion of a predetermined region, dividing the predetermined region into detail areas, calculating distances values indicative of distances between the detail areas and each of a plurality of base stations, and setting/storing the distance values and location information according to the distance values in a table in advance;
receiving discrimination information transmitted from the mobile terminal and calculating distances between the mobile terminal and the respective base stations based on delayed time for receiving the discrimination information;
transmitting the calculated distance values to the cell controller;
comparing the transmitted distance values with the distance values stored in the table,
determining a distance value of the table that is substantially consistent with the transmitted distance values, and
selecting location information from the table corresponding to the determined distance value, said selected location information corresponding to a location of the mobile terminal.

11. The method of claim 10, wherein a distance D between the mobile terminal and each of the base station is calculated based on the following equations:

$$L = C \times T, D = \sqrt{(L \times L) - (h \times h)}$$

where C denotes light velocity, T denotes reach delay time of a predetermined signal transmitted from the base station to the terminal, and h denotes a height of a base station antenna.

12. The method of claim 10, further comprising:
transmitting the location information to the mobile telecommunication terminal again.

13. The method of claim 10, wherein the distance value D is expressed as a coordinate value.

14. A method for tracing a location of mobile telecommunication terminals comprising:
when a mobile terminal is located at portion other than a center portion of a predetermined region, dividing the predetermined region into several areas, calculating distance values between the several areas and the base stations, and setting/storing the distance values and location information according to the distance values in a table of a cell controller in advance,
receiving discrimination information transmitted from the mobile terminal and calculating distances between the mobile telecommunication terminal and the respective base stations based on delayed time for receiving the discrimination information;
transmitting the calculated distance values to the cell controller;
comparing the distance values with the distance values stored in the table,
determining a distance value of the table which is similar to the distance values, and
selecting location information from the table corresponding to the determined distance value, said location information corresponding to a location of the mobile terminal.

15. The method of claim 14, wherein a distance D between the mobile terminal and each of the base station is calculated based on the following equations:

$$L = C \times T, D = \sqrt{(L \times L) - (h \times h)}$$

where C denotes light velocity, T denotes reach delay time of a predetermined signal transmitted from the base station to the terminal, and h denotes a height of a base station antenna.

16. The method of claim 14, further comprising:
transmitting the location information to the mobile terminal again.

17. The method of claim 14, wherein the calculated distance valued is expressed as a coordinate value.

18. The system of claim 1, wherein the cell controller is coupled to the base stations through a network.

19. The system of claim 1, wherein the location of the mobile terminal is determined to correspond to the region having coordinate values that most closely match the distance values transmitted from the base stations.

20. The system of claim 19, wherein the coordinate values for each region indicate distances between substantially a center of the region and respective ones of the base stations.

21. The system of claim 19, wherein the cell controller determines the coordinate values of each region by computing a distance between each base station and another mobile terminal.

22. The method of claim 10, wherein said calculating includes:
calculating distances values indicative of distances between mobile terminals in respective ones of the detail areas and the plurality of base stations.

23. The method of claim 14, wherein said calculating includes:
calculating distances values indicative of distances between mobile terminals in respective ones of the several areas and the plurality of base stations.

24. A location tracing system for mobile telecommunication terminals comprising:
a mobile terminal for transmitting a predetermined signal including discrimination information with a predetermined interval;
a plurality of base stations, each calculating a distance from the mobile terminal based on a reception time of the predetermined signal transmitted from the mobile terminal; and
a cell controller which traces a location of the mobile terminal based on distance values transmitted from the plurality of base stations, the cell controller coupled to the base stations and located at a position different from the location of the mobile terminal,
wherein the cell controller sets and stores location information corresponding to the distance values in a table in advance and determines the location information through the table when the calculated values are transmitted from the plurality of base stations, thereby tracing a location of the mobile telecommunication terminal.

* * * * *